US011942051B2

(12) United States Patent
Xu et al.

(10) Patent No.: US 11,942,051 B2
(45) Date of Patent: Mar. 26, 2024

(54) DISPLAY PANEL, CONTROL METHOD THEREOF AND STORAGE MEDIUM

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventors: Fengcheng Xu, Guangdong (CN); Jinfeng Liu, Guangdong (CN)

(73) Assignees: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 86 days.

(21) Appl. No.: 17/424,552

(22) PCT Filed: Apr. 30, 2021

(86) PCT No.: PCT/CN2021/091668
§ 371 (c)(1),
(2) Date: Jul. 21, 2021

(87) PCT Pub. No.: WO2022/217670
PCT Pub. Date: Oct. 20, 2022

(65) Prior Publication Data

US 2022/0392416 A1 Dec. 8, 2022

(51) Int. Cl.
*G09G 3/36* (2006.01)

(52) U.S. Cl.
CPC ....... *G09G 3/36* (2013.01); *G09G 2300/0842* (2013.01); *G09G 2320/0233* (2013.01);
(Continued)

(58) Field of Classification Search
CPC ............. G09G 3/36; G09G 2300/0842; G09G 2320/0233; G09G 2320/0247; G09G 2320/0626; G09G 2360/16; G09G 3/3614
See application file for complete search history.

(56) References Cited

U.S. PATENT DOCUMENTS 10,777,147 B2 * 9/2020 Wu .......................... G09G 3/20
11,455,966 B2 * 9/2022 Qiu ...................... G09G 3/3208
(Continued)

FOREIGN PATENT DOCUMENTS

CN 1908741 A 2/2007
CN 104157251 A 11/2014
(Continued)

*Primary Examiner* — Sardis F Azongha
(74) *Attorney, Agent, or Firm* — Rivka Friedman

(57) ABSTRACT

A display panel, a control method thereof, and a storage medium are provided. The method includes acquiring a first actual brightness parameter and a first reference brightness parameter at a first position; determining a first compensated brightness parameter at the first position according to the first reference brightness parameter and the first actual brightness parameter if the absolute value of the difference between the first reference brightness parameter and the first actual brightness parameter is not less than a first threshold; and determining a first target brightness parameter at the first position according to the first compensated brightness parameter and a first preset brightness parameter at the first position.

13 Claims, 8 Drawing Sheets

(52) U.S. Cl.
CPC ............... *G09G 2320/0247* (2013.01); *G09G 2320/0626* (2013.01); *G09G 2360/16* (2013.01)

(56) References Cited

U.S. PATENT DOCUMENTS

2019/0221156 A1* 7/2019 Yan ...................... G09G 3/2003
2019/0362671 A1* 11/2019 Kuki .................... G09G 3/2007

FOREIGN PATENT DOCUMENTS

| | | | | | |
|---|---|---|---|---|---|
| CN | 104464627 | A | | 3/2015 | |
| CN | 105529008 | A | | 4/2016 | |
| CN | 105741783 | A | | 7/2016 | |
| CN | 106847157 | A | * | 6/2017 | ............... G09G 3/20 |
| CN | 106847157 | A | | 6/2017 | |
| CN | 107068098 | A | | 8/2017 | |
| CN | 107093412 | A | | 8/2017 | |
| CN | 107452354 | A | | 12/2017 | |
| CN | 107863068 | A | | 3/2018 | |
| CN | 110060618 | A | | 7/2019 | |
| CN | 111243551 | A | | 6/2020 | |
| CN | 112365862 | A | | 2/2021 | |
| WO | 2012073808 | A1 | | 6/2012 | |

* cited by examiner

DISPLAY PANEL, CONTROL METHOD THEREOF AND STORAGE MEDIUM

FIELD OF INVENTION

The present disclosure relates to the technical field of display, which particularly relates to a manufacture of display devices. Specifically, it relates to a display panel, a control method thereof, and a storage medium.

BACKGROUND OF INVENTION

A liquid crystal display (LCD) drives deflection of liquid crystal molecules by applying a voltage across the liquid crystal molecules, to control the degree of polarization of each pixel to achieve the purpose of display.

When driving the liquid crystal molecules in the LCD, in order to prevent the liquid crystal molecules from being damaged by a long-time fixed electric field, the voltage across the liquid crystal molecules is set bipolarly. However, the parasitic capacitance generated between the gate line and the pixel electrode will cause the voltage value in the pixel electrode to be different from the voltage value in the data line. For said bipolar setting, in the case where luminous emittance of the polarized light emitted by the corresponding pixel in the adjacent two periods of time should be the same, the parasitic capacitance will vary luminous emittance of the polarized light in the corresponding pixel in multiple frames. As a result, the LCD appears screen flickers, which reduce the display quality of the LCD.

Therefore, it is necessary to provide a display panel, a control method thereof, and a storage medium to improve the screen flickers of the LCD, thereby improving the display quality of the LCD.

SUMMARY OF INVENTION

Technical Problem

An object of the embodiment of the present disclosure is to provide a display panel, a control method thereof, and a storage medium to alleviate the current technical problem of screen flickering on the display panel with abnormal brightness.

Technical Solution

An embodiment of the present disclosure provides a control method of display panel, comprising steps of:

acquiring a first actual brightness parameter and a first reference brightness parameter at a first position in a display panel;

determining whether an absolute value of a difference value between the first reference brightness parameter and the first actual brightness parameter is less than a first threshold;

determining a first compensated brightness parameter at the first position in the display panel according to the difference value between the first reference brightness parameter and the first actual brightness parameter when the absolute value of the difference value between the first reference brightness parameter and the first actual brightness parameter is greater than the first threshold;

determining a first target brightness parameter at the first position in the display panel according to the first compensated brightness parameter and a first preset brightness parameter at the first position in the display panel.

In one embodiment, the step of acquiring the first actual brightness parameter and the first reference brightness parameter at the first position in the display panel comprises:

acquiring a first pixel voltage and a first data voltage at the first position in the display panel as the first actual brightness parameter and the first reference brightness parameter, respectively.

In one embodiment, the step of determining the first target brightness parameter at the first position in the display panel according to the first compensated brightness parameter and the first preset brightness parameter at the first position in the display panel comprises:

acquiring a first preset data voltage at the first position in the display panel;

determining a first target data voltage of the first position in the display panel according to the first compensated brightness parameter and the first preset data voltage.

In one embodiment, the step the step of determining the first target brightness parameter at the first position in the display panel according to the first compensated brightness parameter and the first preset brightness parameter at the first position in the display panel comprises:

acquiring a first common voltage at the first position in the display panel;

determining a first target common voltage at the first position in the display panel according to the first compensated brightness parameter and the first common voltage.

In one embodiment, after the step of determining the first target common voltage at the first position in the display panel according to the first compensated brightness parameter and the first common voltage, the control method further comprises steps of:

acquiring a difference value between the first target common voltage and a second common voltage at a second position in the display panel as a first difference value;

updating the second common voltage to be the first target common voltage;

acquiring a difference value between a second pixel voltage and a second data voltage at the second position in the display panel as a second difference value; and determining a second target data voltage at the second position in the display panel according to the first difference value, the second difference value, and a second preset data voltage at the second position in the display panel.

In one embodiment, after the step of determining the first target common voltage at the first position in the display panel according to the first compensated brightness parameter and the first common voltage, the control method further comprises:

updating the first common voltage to be the first target common voltage.

In one embodiment, after the step of determining the first compensated brightness parameter at the first position in the display panel according to the difference value between the first reference brightness parameter and the first actual brightness parameter, the control method further comprises steps of:

acquiring a position difference parameter between a third position and the first position in the display panel;

determining a third compensated brightness parameter at the third position in the display panel according to the position difference parameter and the first compensated brightness parameter.

In one embodiment, the step of determining the first target brightness parameter at the first position in the display panel according to the first compensated brightness parameter and the first preset brightness parameter at the first position in the display panel comprises steps of:

acquiring a first charging duration at the first position in the display panel;

determining a first target charging duration at the first position in the display panel according to the first compensated brightness parameter and the first charging duration.

In one embodiment, the step of acquiring the first actual brightness parameter and the first reference brightness parameter at the first position in the display panel comprises steps of:

acquiring a plurality of first sub-actual brightness parameters and a plurality of first sub-reference brightness parameters at first sub-positions of the first position;

determining respectively the first actual brightness parameter and the first reference brightness parameter according to the plurality of first sub-actual brightness parameters and the plurality of first sub-reference brightness parameters.

In one embodiment, the first actual brightness is an actual brightness value of a sub-pixel located in the first position or a parameter related to the actual brightness value of the sub-pixel located in the first position.

In one embodiment, the first preset brightness parameter is a theoretical brightness value of a sub-pixel located in the first position or a parameter related to the theoretical brightness value of the sub-pixel located in the first position during a screen display period of the display panel.

In one embodiment, the first target brightness parameter is an actual brightness value corresponding to the first target brightness parameter of a sub-pixel located in the first position, and the first target brightness parameter is equal to a theoretical brightness value corresponding to the first preset brightness parameter of the sub-pixel located in the first position.

The present disclosure provides a display panel, the display panel comprises a controller and a memory, wherein the controller is used to execute instructions stored in the memory to implement said method.

The present disclosure provides a storage medium, the storage medium stores instructions, wherein the instructions are used for execution by a controller to implement said method.

Beneficial Effects

The present disclosure provides a display panel, a control method thereof, and a storage medium, wherein the method includes steps of acquiring a first actual brightness parameter and a first reference brightness parameter at a first position in a display panel; determining whether an absolute value of a difference value between the first reference brightness parameter and the first actual brightness parameter is less than a first threshold; if not, determining a first compensated brightness parameter at the first position in the display panel according to the difference value between the first reference brightness parameter and the first actual brightness parameter; determining a first target brightness parameter at the first position in the display panel according to the first compensated brightness parameter and a first preset brightness parameter at the first position in the display panel. In this solution, the first target brightness parameter is determined according to the first compensated brightness parameter and the first preset brightness parameter at the first position in the display panel, to load electrical signals corresponding to the first target brightness parameter to the first position. Since the difference between the first reference brightness parameter and the first actual brightness parameter is considered to determine the first target brightness parameter, the first position emits the brightness corresponding to the first preset brightness parameter, which may effectively reduce the abnormal brightness caused by the parasitic capacitance, thereby improving the flickering phenomenon of the bipolar display during the transition between the forward bias and the reverse bias and improving the display quality of the display panel.

DESCRIPTION OF DRAWINGS

The present disclosure may be further explained with the drawings below. It should be noted that the drawings in the following description are only used to explain some embodiments of the present disclosure. For those skilled in the art, without creative work, other drawings may be obtained from these drawings.

FIG. 4(*b*) is a waveform diagram of a part of an electrical signal corresponding to another pixel in the display panel in prior art.

FIG. 4(*c*) is a waveform diagram of a part of an electrical signal corresponding to another pixel in the display panel in prior art.

DETAILED DESCRIPTION OF PREFERRED EMBODIMENTS

Figure 1:
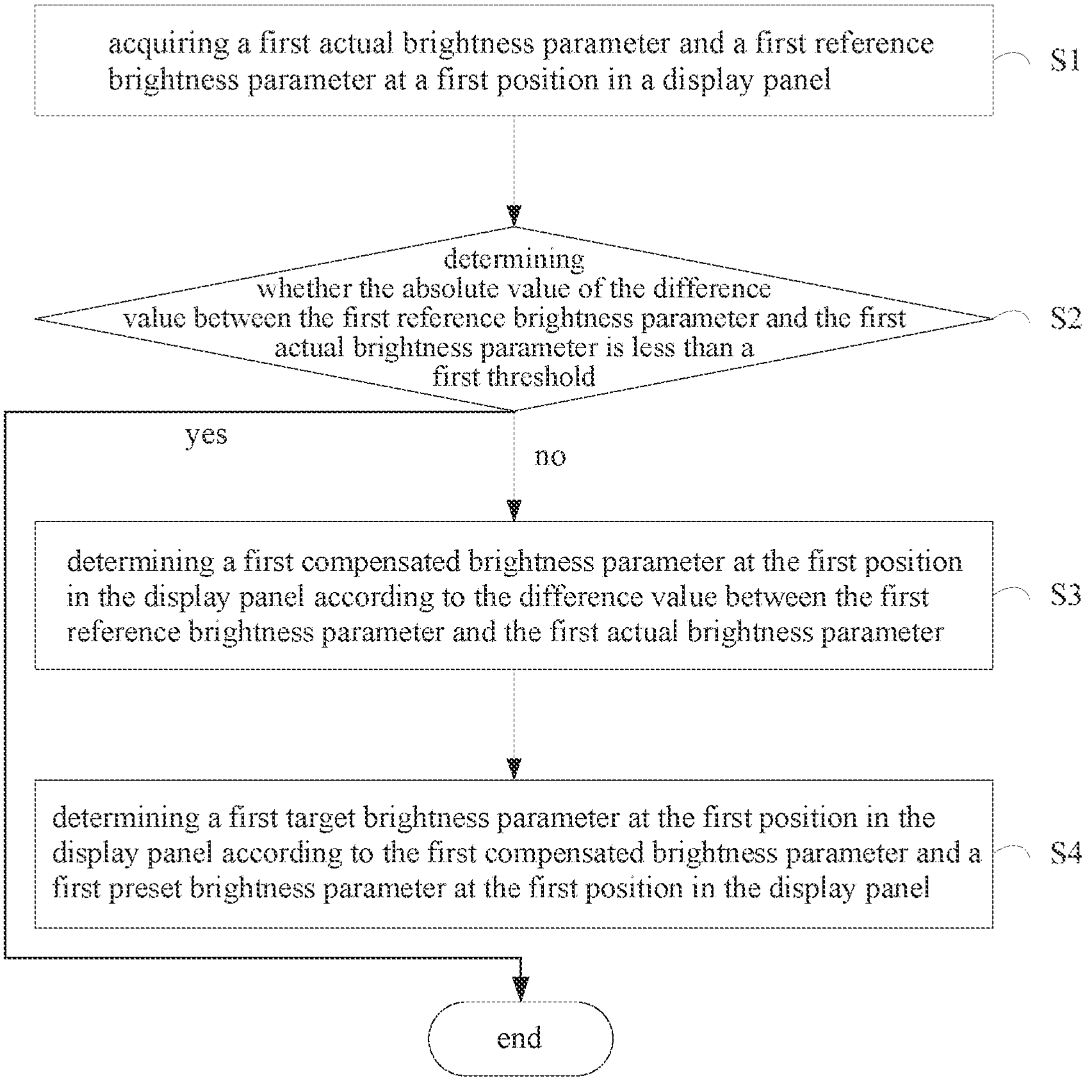
FIG. 1 is a flowchart of a first embodiment of a control method of a display panel an embodiment of present disclosure.

The technical solutions in the embodiments of the present disclosure may be clearly and completely described below in conjunction with the drawings in the embodiments of the present disclosure. Obviously, the described embodiments are only a part of the embodiments of the present disclosure, rather than all the embodiments. Based on the embodiments in the present disclosure, all other embodiments obtained by those skilled in the art without creative work shall fall within the protection scope of the present disclosure.

In the description of the present disclosure, it needs to be understood that the orientation or positional relationship indicated by the terms "corresponding", "proximal", "remote", etc. are based on the orientation or positional relationship shown in the drawings. The orientation or positional relationship is only for the convenience of describing the present disclosure and simplifying the description, rather than indicating or implying that the device or element referred to must have a specific orientation, be constructed, and operated in a specific orientation, and therefore cannot be understood as a limitation of the present disclosure. In addition, the terms "first", "second", etc. are only used for descriptive purposes, and cannot be understood as indicating or implying relative importance or implicitly indicating the number of indicated technical features. Therefore, the features defined with "first" and "second" may explicitly or implicitly include one or more of the features. In the description of the present disclosure, "multiple" means two or more than two. Unless specifically defined otherwise, "electrically connected" means that the two are electrically connected, and it is not limited to direct or indirect connection. It should also be noted that the drawings provide only structures that are relatively closely related to the present disclosure, and some details that are not related to the invention are omitted. The purpose is to simplify the drawings and make the invention clear briefly, instead of showing that the actual device is the same as the drawings, not as a limitation of the actual device.

The present disclosure provides a control method of a display panel. The method includes but is not limited to the following embodiments and a combination of the following embodiments.

In an embodiment, as shown in FIG. 1, the control method of the display panel includes but is not limited to the following steps.

Step S1, acquiring a first actual brightness parameter and a first reference brightness parameter at a first position in the display panel.

The display panel may be a liquid crystal display panel or an organic light emitting diode display panel. It can be understood that the display panel includes a plurality of sub-pixels, and each of the sub-pixels has a corresponding brightness. When the corresponding voltage is applied to the sub-pixel, the first actual brightness parameter and the first reference brightness parameter may respectively represent the actual brightness and the theoretical brightness of the sub-pixel located at the first position. Further, the first actual brightness parameter and the first reference brightness parameter may also include at least one parameter affecting the actual brightness of the corresponding sub-pixel and at least one parameter that affects the theoretical brightness of the corresponding sub-pixel, such as the corresponding voltage value, charging time, etc.

Figure 2:
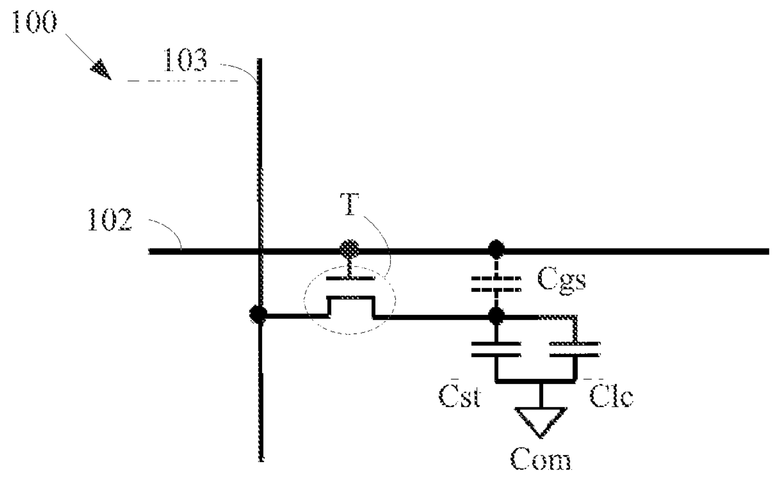
FIG. 2 is a schematic circuit diagram of a circuit unit in a display panel according to an embodiment of present disclosure.

When the display panel is a liquid crystal display panel, for the equivalent circuit corresponding to each sub-pixel, refer to a circuit unit 100 shown in FIG. 2. The circuit unit 100 is defined by gate lines 102 and data lines 103 that are arranged crosswise. The circuit unit 100 includes a thin film transistor T, a liquid crystal capacitor Clc, a storage capacitor Cst, and a common electrode Com. The gate and source of the thin film transistor T are electrically connected to the gate line 102 and the data line 103, respectively. The common electrode Com includes a common electrode of an array substrate and a common electrode of a color filter substrate. The storage capacitor Cst and the liquid crystal capacitor Clc are formed between the drain of the thin film transistor and the common electrode of the array substrate and the common electrode of the color filter substrate, respectively. It should be noted that there is a coupling capacitance Cgs between the gate line 102 and the drain of the thin film transistor T. Therefore, when the electrical signal transmitted in the gate line 102 is reduced from a high voltage Vgh to a low voltage Vgl, the voltage difference between the two ends of the coupling capacitor Cgs cannot change suddenly. As a result, the voltage value of the electrical signal transmitted in the drain of the thin film transistor T may also be reduced. That is, the voltage value Vs of the electrical signal transmitted in the drain of the thin film transistor T is lower than the voltage value Vd of the electrical signal transmitted in the source of the thin film transistor T.

Figure 3:
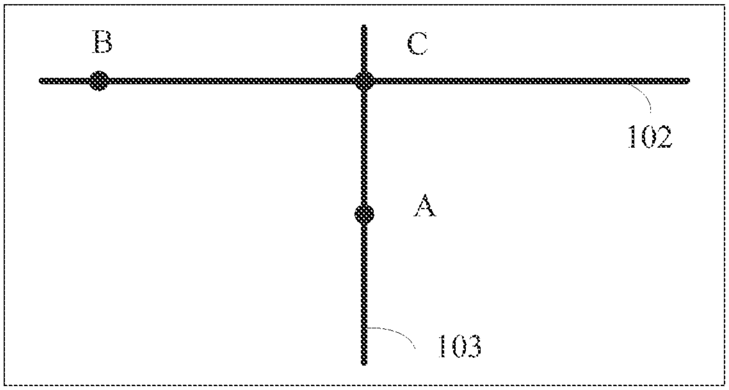
FIG. 3 is a schematic top view of a display panel according to an embodiment of present disclosure.
Figure 4A:
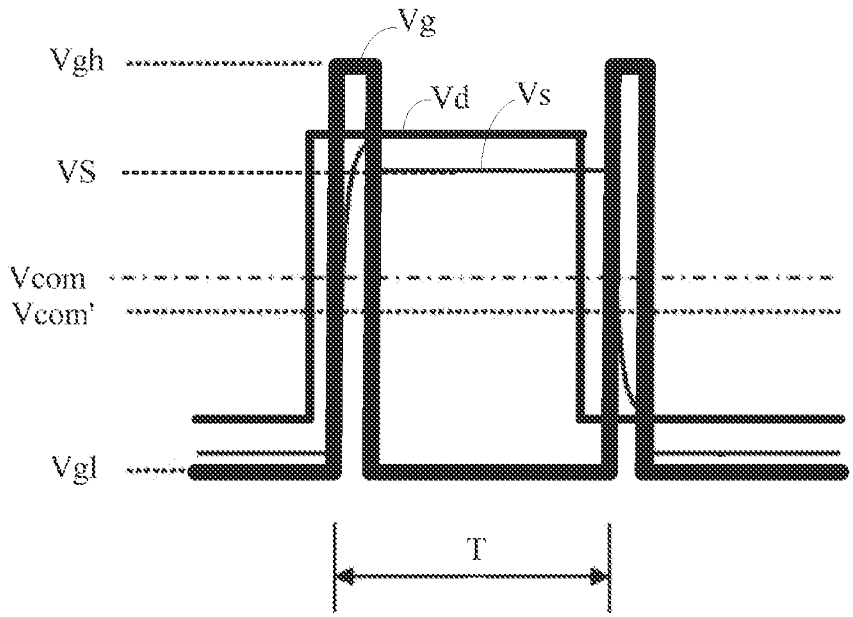
FIG. 4(a) PRIOR ART
FIG. 4(*a*) is a waveform diagram of a part of an electrical signal corresponding to a pixel in the display panel in prior art.
Figure 4B:
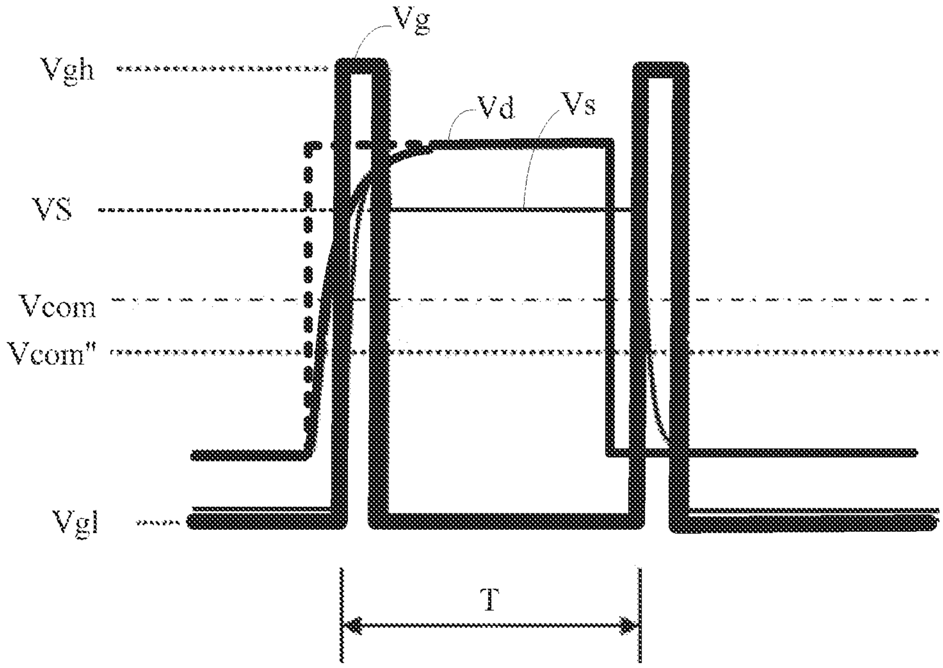
FIG. 4(b) PRIOR ART
Figure 4C:
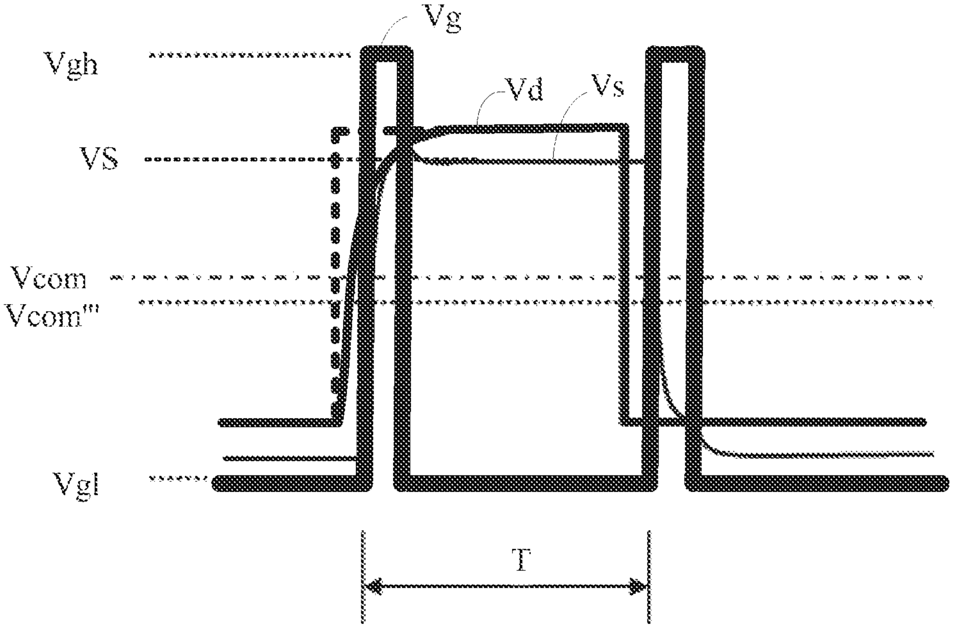
FIG. 4(c) PRIOR ART

Specifically, as shown in FIG. 3, one of the proximal pixel B of the gate line 102, the remote sub-pixel C of the gate line 102, and the proximal pixel A of the data line 103 corresponding to the sub-pixel C may be described as an example. FIG. 4(*a*), FIG. 4(*b*), and FIG. 4(*c*) respectively show the waveform diagrams of several electrical signals corresponding to the sub-pixel A, the sub-pixel B, and the sub-pixel C. Vg, Vd, and Vs are the electrical signal transmitted in the gate line 102, the electrical signal transmitted in the data line 103, and the electrical signal transmitted in the drain of the thin film transistor T. The period of one frame is T, and it can be considered that the period T is equal to the time interval between two adjacent rising edges in the electrical signal Vg. The period T of one frame is discussed here. It can be understood that after the voltage value of the electrical signal Vg transmitted in the gate line 102 becomes the corresponding high voltage Vgh in the period T, the electrical signal Vs transmitted in the drain of the thin film transistor T may theoretically be equal to the electrical signal Vd transmitted in the data line 103. It should be noted that, as shown in FIG. 4(*b*) and FIG. 4(*c*), the electrical signal Vd transmitted in the corresponding data line 103 in the sub-pixel B and the electrical signal Vd transmitted in the corresponding data line 103 in the sub-pixel C are equivalent. The sub-pixel B and the sub-pixel C are respectively the proximal sub-pixel and the remote sub-pixel of the gate line 102. The attenuation, rising speed, and falling speed of the electrical signal Vg at the sub-pixel B and the electrical signal Vg at the sub-pixel C are different. As a result, the coupling capacitance Cgs at the sub-pixel C and the coupling capacitance Cgs at the sub-pixel B are different. When the voltage value of the electrical signal Vg transmitted in the gate line 102 changes from the high voltage Vgh to the low voltage Vgl, the electrical signal (Vd-Vs) at sub-pixel C and the electrical signal (Vd-Vs) at sub-pixel B are different. As shown in FIG. 4(*a*) and FIG. 4(*c*), the electrical signals Vg transmitted in the corresponding gate lines 102 in the sub-pixel C and the electrical signals Vg transmitted in the corresponding gate lines 102 in the sub-pixel A are equivalent. Since the sub-pixel C and the sub-pixel A are respectively the remote sub-pixel and the proximal pixel of the data line 103, the attenuation and rise speed of the electrical signal Vd at the sub-pixel C and the electrical signal Vd at the sub-pixel A are different. Similarly, when the voltage value of the electrical signal Vg transmitted in the gate line 102 changes from the high voltage Vgh to the low voltage Vgl, the coupling capacitor Cgs at the sub-pixel C and the coupling capacitor Cgs at the sub-pixel A are different. As a result, the electrical signal (Vd-Vs) at the sub-pixel C and the electrical signal (Vd-Vs) at the sub-pixel A are different.

Further, according to the above analysis, it can be known that the two ends of each data line 103 are respectively connected to the corresponding data signal source and the corresponding multiple sub-pixels. For the multiple sub-pixels on the same data line 103, due to the resistance consumption of the data line 103, there is a difference between the electrical signal Vg at the multiple sub-pixels and the output signal Vg1 of the corresponding data signal source. It is understandable that according to the above analysis, for each of the sub-pixels, there is a difference between the corresponding electric signal Vs and the output signal Vg1 of the corresponding data signal source, and there is also a difference between the corresponding electric signal Vs and the corresponding electric signal Vs.

The first position may be the position of any sub-pixel in the display panel. Further, the first position may be the center position of the display panel or the proximal sub-pixel controlled by the data line of the sub-pixel that controls the center position of the display panel. The first actual brightness parameter and the first reference brightness parameter are the electrical signal Vg corresponding to the sub-pixel at the first position from the high voltage Vgh to the low voltage Vgl and the parameters of the stable period of the electrical signal Vs.

Specifically, the first actual brightness parameter may be the actual brightness value of the sub-pixel located at the first position or a parameter related to the actual brightness value of the sub-pixel located at the first position, which may include but is not limited to the electrical signal Vs corresponding to the sub-pixel located in the first position and the electrical signal corresponding to the common electrode of the color filter substrate in this step. The first reference brightness parameter may be the theoretical brightness value of the sub-pixel at the first position, or a parameter related to the theoretical brightness value of the sub-pixel at the first position and may include but is not limited to the output signal Vg1 of the data signal source corresponding to the sub-pixel located in the first position in this step.

Step S2, determining whether an absolute value of a difference value between the first reference brightness parameter and the first actual brightness parameter is less than a first threshold.

It is understandable that the first threshold may be set according to the actual brightness difference of the display panel. For example, the absolute value corresponding to a difference between a smaller and a larger difference in brightness of the sub-pixels at the first position in the display panel visually observed by human eyes may be used as the first threshold. As an example, the first actual brightness parameter is the actual brightness value of the sub-pixel located at the first position, and the first reference brightness parameter is the theoretical brightness value of the sub-pixel located at the first position. Specifically, when the absolute value of the difference between the actual brightness value and the theoretical brightness value of the sub-pixel located at the first position is less than the first threshold value, processing may not be performed. Otherwise, it is necessary to adjust the parameters related to the sub-pixel located in the first position.

When the judgment result of step S2 is no, that is, when the absolute value of the difference between the first reference brightness parameter and the first actual brightness parameter is greater than the first threshold, at least the following steps S3 and S4.

Step S3, determining a first compensated brightness parameter at the first position in the display panel according to the difference value between the first reference brightness parameter and the first actual brightness parameter.

For illustration, the first actual brightness parameter is the actual brightness value of the sub-pixel at the first position, and the first reference brightness parameter is the theoretical brightness of the sub-pixel at the first position value. It can be understood that when the absolute value of the difference between the actual brightness value and the theoretical brightness value of the sub-pixel located at the first position is greater than the first threshold, which indicates that the actual brightness value and the theoretical brightness value of the sub-pixel at the first position have a large difference. At this time, the first compensated brightness parameter may be equal to the difference between the first reference brightness parameter and the first actual brightness parameter.

Step S4, determining a first target brightness parameter at the first position in the display panel according to the first compensated brightness parameter and a first preset brightness parameter at the first position in the display panel.

It should be noted that the steps S1 to S4 may be executed during the test of the display panel, and the display panel may be controlled to display images after the first target brightness parameter is determined. Wherein, the step S1 to the step S3 may be performed on each of the sub-pixels in the display panel to acquire the first compensated brightness parameter corresponding to each of the sub-pixels before performing the step S4. It is also possible to perform the step S1 to the step S4 on the sub-pixel located in the first position in the display panel to control the light-emitting condition of the sub-pixel in the first position.

The first preset brightness parameter may be the theoretical brightness value of the sub-pixel located in the first position during the screen display period of the display panel or a parameter related to the theoretical brightness value of the sub-pixel located at the first position. For illustration, the first preset brightness parameter is the theoretical brightness value of the sub-pixel located at the first position during the screen display period of the display panel. It can be understood that the actual brightness value and the theoretical brightness value of the sub-pixel at the first position are quite different. That is, the difference between the actual brightness value and the theoretical brightness value corresponding to the first preset brightness parameter in the sub-pixels in the first position is relatively large. Wherein, the first actual brightness parameter is the actual brightness value of the sub-pixel located at the first position, and the first reference brightness parameter is the theoretical brightness value of the sub-pixel located at the first position. The first target brightness parameter may be equal to the difference between the first preset brightness parameter and the first compensated brightness parameter.

It is understandable that based on the first preset brightness parameter and in combination with the first compensated brightness parameter, the first target brightness parameter can be calculated. That is, the actual brightness value corresponding to the first target brightness parameter in the sub-pixel at the first position may be equal to the theoretical brightness value corresponding to the first preset brightness parameter in the sub-pixel at the first position. In this embodiment, the sub-pixel at the first position in the display panel may be displayed as a theoretical brightness value corresponding to the first preset brightness parameter.

Further, when the display panel is a bipolar liquid crystal display panel, each of the sub-pixels deflects in opposite directions during two adjacent time periods. For example, when the voltage value of the electrical signal of the common electrode of the color filter substrate is OV, if the polarities of the adjacent first and second time periods are respectively positive and negative. For example, the voltage on the pixel electrode is −4 V and 8V in the first period and the second period, respectively, and the liquid crystal molecules may be forward-biased a and reverse-biased (−2*α) during the first period and the first period, respectively. It is understandable that the voltage value of the electrical signal of the common electrode of the color filter substrate is OV. When the difference between the first reference brightness parameter and the first actual brightness parameter is positive, the deflection amplitude of the positively deflected liquid crystal molecules may be increased, and the deflection amplitude of the negatively deflected liquid crystal molecules may be reduced. That is, the difference between the first reference brightness parameter and the first actual brightness parameter has an inconsistent effect on the deflection amplitude of positively deflected liquid crystal molecules and on the deflection amplitude of negatively deflected liquid crystal molecules. As a result, the screen flickers during the transition period between positive deflection and reverse deflection. In this embodiment, the light-emitting brightness of the corresponding sub-pixel may be controlled by the first compensation brightness parameter to be a theoretical brightness value corresponding to the first preset data voltage, to improve the above-mentioned screen flicker phenomenon.

Figure 5:
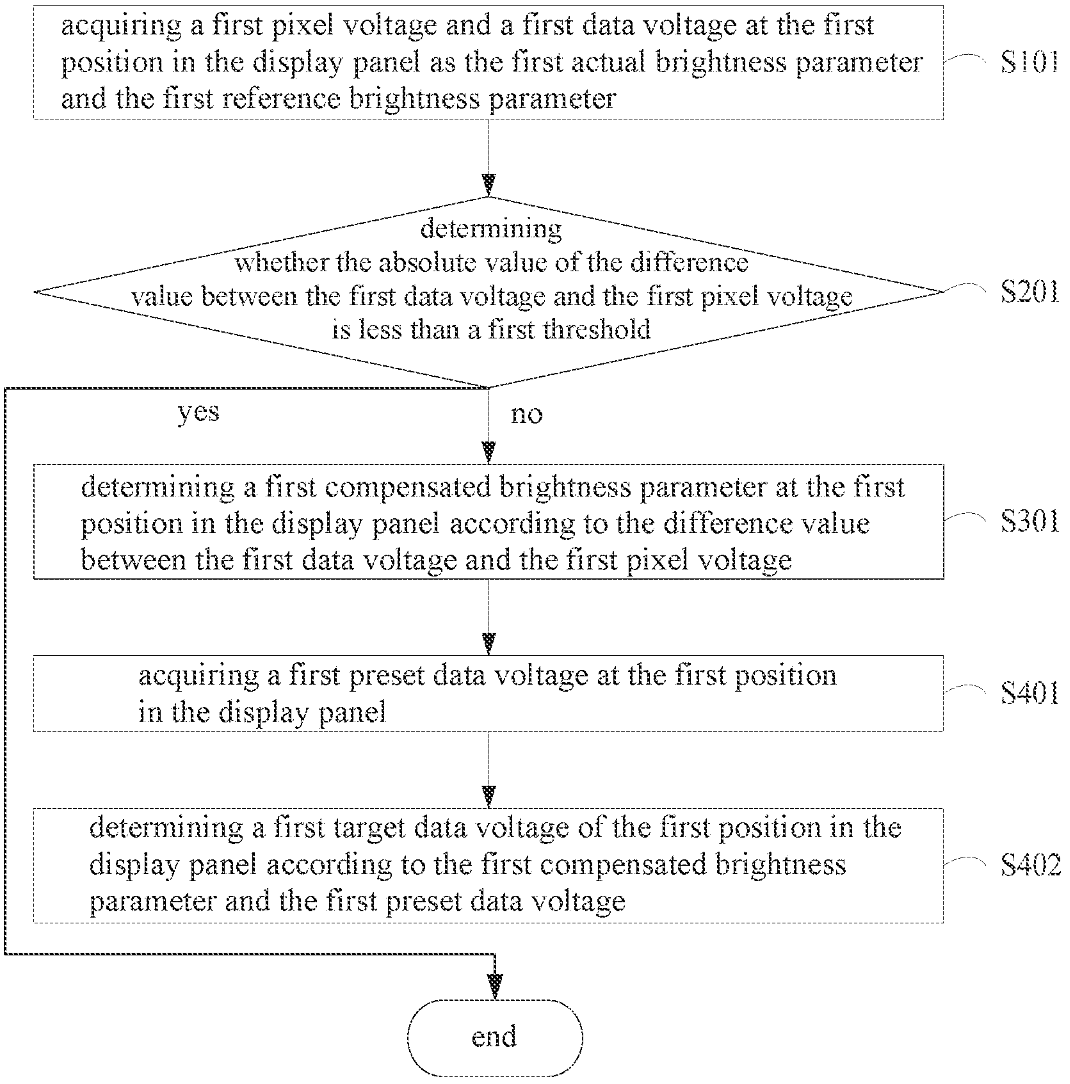
FIG. 5 is a flowchart of a second embodiment of a control method of a display panel an embodiment of present disclosure.
Figure 6:
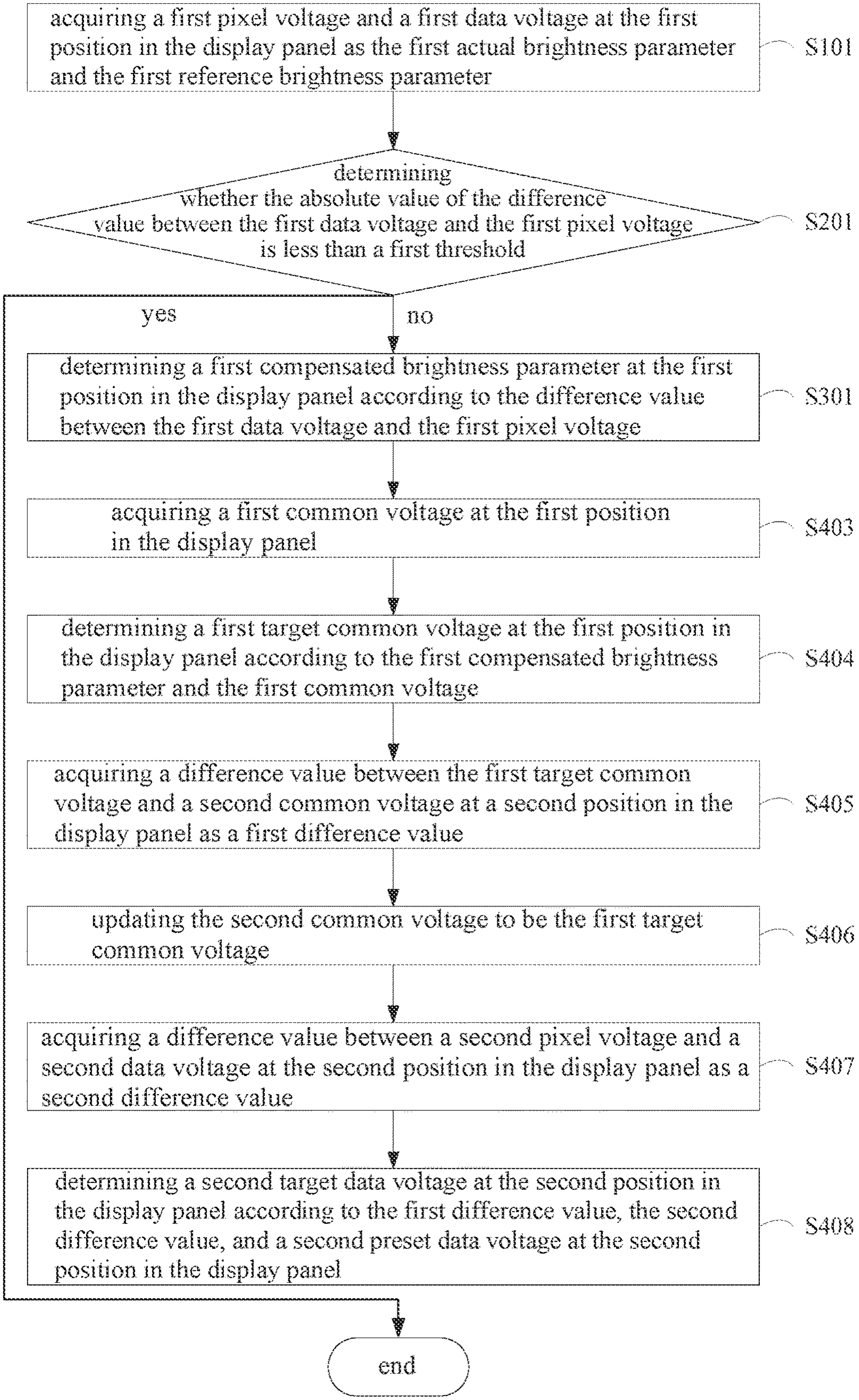
FIG. 6 is a flowchart of a third embodiment of a control method of a display panel an embodiment of present disclosure.

In an embodiment, as shown in FIG. 5 and FIG. 6, the step S1 may include but is not limited to the following steps:

Step S101, acquiring a first pixel voltage and a first data voltage at the first position in the display panel as the first actual brightness parameter and the first reference brightness parameter, respectively.

Specifically, as shown in FIG. 2, the drain of the thin film transistor T may be electrically connected to the pixel electrode, that is, the first pixel voltage may be equal to the electrical signal Vs corresponding to the sub-pixel in the first position Voltage value when stable, and the first data voltage is the voltage value of the electrical signal output by the data signal source connected to the corresponding data line 103. According to the above analysis, the attenuation of the electrical signal Vd and the existence of the coupling capacitor Cgs, the first pixel voltage may be less than the first data voltage. It is understandable that the first pixel voltage may be understood as the corresponding actual voltage value of the drain of the thin film transistor T, which determines the actual brightness of the sub-pixel at the first position. The first data voltage may be understood as the corresponding theoretical voltage value of the drain of the thin film transistor T, which determines the theoretical brightness of the corresponding sub-pixel at the first position. Therefore, the first pixel voltage and the first data voltage may be used as the first actual brightness parameter and the first reference brightness parameter, respectively.

It is understandable that, as shown in FIG. 5 and FIG. 6, based on the step S101, the step S2 may include but is not limited to the following steps: step S201, determine whether the absolute value of the difference between the first data voltage and the first pixel voltage is less than the first threshold; the step S3 includes but is not limited to the following steps: step S301, if not, determining the first compensated brightness parameter of the first position in the display panel according to the difference between the first data voltage and the first pixel voltage. The first compensated brightness parameter may be equal to the difference between the first data voltage and the first pixel voltage. For example, when the first pixel voltage and the first data voltage are 6V and 8V, respectively, the first compensation brightness parameter is −2 V. Specifically, the step S201 and the step S301 may refer to the description of the step S2 and the step S3 above, respectively.

In an embodiment, as shown in FIG. 5, based on the step S101, the step S4 may include but is not limited to the following steps:

Step S401, acquiring a first preset data voltage at the first position in the display panel.

Specifically, according to the above analysis, the step S401 and subsequent steps may be performed during the test period of the display panel. The first preset data voltage may be a theoretical value of the corresponding electrical signal Vs of the sub-pixel located at the first position during the screen display period of the display panel. It is understandable that when the voltage value of the electrical signal output by the corresponding data signal source is equal to the first preset data voltage, the actual value of the electrical signal Vs of the sub-pixel at the first position and the theoretical value of the electrical signal Vs have a large difference.

Step S402, determining a first target data voltage of the first position in the display panel according to the first compensated brightness parameter and the first preset data voltage.

According to the above analysis, the first compensation brightness parameter may be equal to the difference between the first data voltage and the first pixel voltage, and the first target data voltage may be equal to the difference between the first preset data voltage and the first compensated brightness parameter. For example, when the first preset data voltage is 3V, the first target data voltage is 5V. It is understandable that based on the first preset data voltage and in combination with the first compensated brightness parameter, the first target data voltage may be calculated. That is, the actual voltage value of the drain of the thin film transistor T corresponding to the first target data voltage in the sub-pixel at the first position may be equal to the theoretical voltage value of the drain of the thin film transistor T corresponding to the first preset data voltage in the sub-pixel at the first position. In this embodiment, the sub-pixel at the first position in the display panel may be displayed as a theoretical brightness value corresponding to the first preset data voltage, which may improve the screen flicker phenomenon in bipolar display.

In an embodiment, as shown in FIG. 6, based on the step S101, the step S4 may also include but is not limited to the following steps:

Step S403, acquiring a first common voltage at the first position in the display panel.

Specifically, according to the above analysis, the step S403 and subsequent steps can be executed during the test of the display panel. The first common voltage may be the voltage value of the electrical signal of the common electrode of the color filter substrate corresponding to the sub-pixel located in the first position during the screen display period of the display panel. It should be noted that the liquid crystal molecules in the first position are located between the corresponding pixel electrode and the corresponding common electrode of the color filter substrate. That is, at least one of the first pixel voltage and the first common voltage controls the deflection state of the corresponding liquid crystal molecules to control the light emitting condition of the corresponding sub-pixel. Further, the common electrode of the color filter substrate in the display panel may be arranged in a whole layer. That is, the voltage value of the electrical signal of the common electrode of the color filter substrate corresponding to each of the sub-pixels may be equal to the first common voltage Vcom. For example, in FIG. 4(*a*), FIG. 4(*b*), and FIG. 4(*c*), the voltage values of the electrical signals of the common electrode of the color filter substrate corresponding to the sub-pixel A, the sub-pixel B, and the sub-pixel C may be equal to the first common voltage Vcom.

Step S404, determining a first target common voltage at the first position in the display panel according to the first compensated brightness parameter and the first common voltage.

It can be understood that according to the above analysis, the actual value of the electrical signal Vs of the sub-pixel at the first position and the theoretical value of the electrical signal Vs are quite different. The first compensated brightness parameter may be equal to the difference between the first data voltage and the first pixel voltage, and the first target common voltage may be equal to the sum of the first common voltage and the first compensated brightness parameter. For example, when the first common voltage and the first compensated brightness parameter are OV and −2 V, respectively, the first target common voltage is −2 V. It can be understood that, referring to FIG. 4(*a*), the description may be made by taking the sub-pixel A in the first position as an example. Based on the first common voltage Vcom, the first target common voltage Vcom' can be calculated in combination with the first compensated brightness parameter. That is, the actual voltage value of the drain of the thin film transistor T corresponding to the first target common voltage Vcom' and the first preset data voltage in the sub-pixel at the first position may be equal to the theoretical voltage value of the drain of the thin film transistor T corresponding to the first preset data voltage and the first common voltage Vcom in the sub-pixel at the first position. Similarly, referring to FIG. 4(*b*) and FIG. 4(*c*), according to the second compensated brightness parameter and the third compensated brightness parameter, the sub-pixel B and the sub-pixel C respectively have corresponding second target common voltage Vcom" and third target common voltage Vcom'". As to the method for determining the second compensated brightness parameter and the method for determining the third compensated brightness parameter, refer to the above-mentioned method for determining the first compensated brightness parameter. As to the method for determining the second target common voltage Vcom" and the third target common voltage Vcom'", refer to the method for determining the first target common voltage Vcom' above.

Further, after step S404, the method may further includes: updating the first common voltage Vcom to be the first target common voltage Vcom'. In this embodiment, the voltage value of the electrical signal of the common electrode of the color filter substrate corresponding to the sub-pixel located at the first position may be adjusted to achieve that the sub-pixel at the first position in the display panel is displayed as a theoretical brightness value corresponding to the first preset data voltage and the first common voltage.

In an embodiment, as shown in FIG. 6, after the step S404, the following steps may be included but not limited to.

Step S405, acquiring a difference value between the first target common voltage and a second common voltage at a second position in the display panel as a first difference value.

It is understandable that in the step S4, the first target common voltage is determined through the steps S403 to S404. For the sub-pixels in the first position, the second common voltage may be updated to the first target common voltage, so that the sub-pixel at the first position is displayed as the theoretical brightness value corresponding to the first preset brightness parameter. However, for the sub-pixel located in the second position, the change of the voltage value of the electrical signal of the common electrode of the color filter substrate may affect the image display of the sub-pixel located at the second position. For illustration, the common electrode of the color filter substrate in the display panel is arranged in a whole layer. That is, the second common voltage is equal to the first common voltage Vcom. For example, when the first target common voltage and the second common voltage are −2 V and OV, respectively, the first difference value is −2 V.

Step S406, updating the second common voltage to be the first target common voltage.

For illustration, the common electrode of the color filter substrate in the display panel is arranged in a whole layer, and the voltage value of the electrical signal of the common electrode of the color filter substrate corresponding to each of the sub-pixels is equal to the first target common voltage Vcom'. That is, the change of the voltage value of the electrical signal of the common electrode of the color filter substrate of each of the sub-pixels is equal to the first difference value, (Vcom'-Vcom).

Step S407, acquiring a difference value between a second pixel voltage and a second data voltage at the second position in the display panel as a second difference value.

The second pixel voltage may be equal to the voltage value when the electrical signal Vs corresponding to the sub-pixel in the second position is stable. The second data voltage is the voltage value of the electrical signal output by the data signal source connected to the corresponding data line 103. Similarly, the sub-pixel located in the second position is also affected by the attenuation of the electrical signal Vd and the coupling capacitor Cgs. As a result, the second pixel voltage may be less than the second data voltage. For example, when the second pixel voltage and the second data voltage are 3V and 6V, respectively, the second difference value is −3 V.

Step S408, determining a second target data voltage at the second position in the display panel according to the first difference value, the second difference value, and a second preset data voltage at the second position in the display panel.

It should be noted that the difference from the embodiment shown in FIG. 5 is: the image display condition of the sub-pixel at the first position is only affected by the attenuation of the electrical signal Vd and the coupling capacitor Cgs in the embodiment shown in FIG. 5. Therefore, in steps S401 to S402, the first target data voltage at the first position in the display panel may be determined according to the first compensated brightness parameter and the first preset data voltage. In this embodiment, the image display condition of the sub-pixel at the first position is not only affected by the attenuation of the electrical signal Vd and the coupling capacitor Cgs, but also affected by the change of the voltage value of the electrical signal of the common electrode of the color filter substrate. Therefore, the step S408 only determines the second target data voltage at the second position in the display panel according to the first difference value (Vcom'-Vcom), the second difference value and the second preset data voltage at the second position in the display panel. Specifically, the second target data voltage may be equal to the value (the second preset data voltage plus the first difference value minus the second difference value). For example, when the second preset data voltage, the first difference value, and the second difference value are 10V, −2 V, and −3 V, respectively, the second target data voltage is 11V.

It is understandable that, based on the second preset data voltage, the second target data voltage may be calculated by combining the first difference value and the second difference value. That is, the actual voltage value of the drain of the thin film transistor T corresponding to the second target data voltage in the sub-pixel at the second position may be equal to the theoretical voltage value of the drain of the thin film transistor T corresponding to the second preset data voltage in the sub-pixel at the first position. In this embodiment, the sub-pixel at the second position in the display panel may be displayed as the theoretical brightness value corresponding to the second preset data voltage, and the screen flicker phenomenon in bipolar display may be improved.

It can be understood that, compared with the embodiment in FIG. 5, this embodiment adds the step of adjusting the voltage value of the electrical signal of the common electrode of the color filter substrate. A position located in the central area of the display panel may be selected as the first position. The first target common voltage corresponding to the sub-pixel located in the first position is used as a reference, and the data voltage of other positions is adjusted. It is equivalent to a relatively high-quality calibration of the voltage value of the electrical signal of the common electrode of the color filter substrate, so as to reduce the interference of the voltage value of the electrical signal of the common electrode of the color filter substrate, and improve the data for adjusting other positions voltage reliability.

Figure 7:
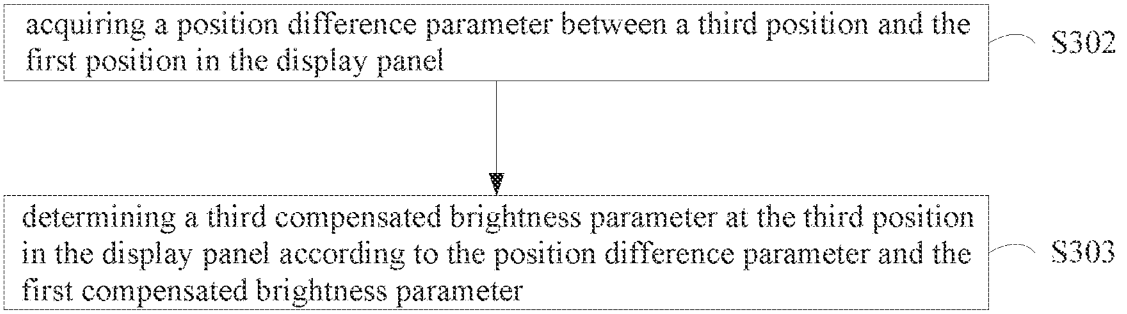
FIG. 7 is a flowchart of a fourth embodiment of a control method of a display panel an embodiment of present disclosure.

In an embodiment, as shown in FIG. 7, after the step S3, the following steps may be included but not limited to:

Step S302, acquiring a position difference parameter between a third position and the first position in the display panel.

The position difference parameter may be a parameter related to the relative position between the third position and the first position. For example, the absolute value of the position difference parameter may be positively correlated with the distance between the third position and the first position. For another example, if the third position is closer to the near end of the gate line 102 or the data line 103 than the first position, the position difference parameter is a negative number. Otherwise it is a positive number.

Step S303, determining a third compensated brightness parameter at the third position in the display panel according to the position difference parameter and the first compensated brightness parameter.

It is understandable that the first compensation brightness parameter may be used as a reference here, and the third compensation brightness parameter may be calculated in combination with the position difference parameter. The third compensated brightness parameter may be the sum of the first compensated brightness parameter and the first compensated brightness parameter. For example, when the first compensated brightness parameter and the position difference parameter are −2 V and −3 V, respectively, the third compensated brightness parameter is −5 V.

Figure 8:
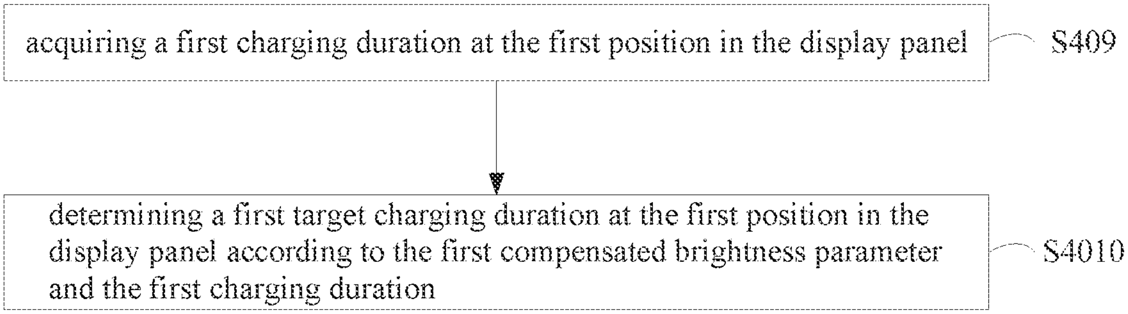
FIG. 8 is a flowchart of a fifth embodiment of a control method of a display panel an embodiment of present disclosure.

In an embodiment, as shown in FIG. 8, the step S4 may further include but is not limited to the following steps.

Step S409, acquiring a first charging duration at the first position in the display panel.

Specifically, as shown in FIG. 4(*a*), FIG. 4(*b*), and FIG. 4(*c*), the electrical signal Vd remains at the corresponding high level for a period, resulting in the corresponding electrical signal Vs at the corresponding stable voltage for a period. The actual brightness value of each sub-pixel is positively correlated with the corresponding stable voltage value VS and duration of the electrical signal Vs. It is understandable that the sub-pixel located at the first position has the first pixel voltage VS when it is stable during the first charging time duration. The first charging duration may be equal to the period T. When the first pixel voltage is lower, the corresponding first charging duration may be increased to increase the actual brightness value of the sub-pixel to reach the theoretical brightness value corresponding to the first data voltage.

Step S4010, determining a first target charging duration at the first position in the display panel according to the first compensated brightness parameter and the first charging duration.

It can be understood that, as shown in FIG. 4(*a*), FIG. 4(*b*), and FIG. 4(*c*), the integral value of the electrical signal Vs in the first charging duration is the actual brightness value of the corresponding sub-pixel. The first compensated brightness parameter may be derived from the difference between the first reference brightness parameter and the first actual brightness parameter. That is, the first reference brightness parameter and the first actual brightness parameter have been acquired before. The first actual brightness parameter includes the integral value of the electrical signal Vd in the corresponding charging duration. The first actual brightness parameter includes the integrated value S1 of the electrical signal Vs during the third charging duration and the first charging duration, and the voltage value when the electrical signal Vs is stable. That is, the first pixel voltage VS. The third charging duration is the duration of the voltage value of the electrical signal Vs from starting to charge to reaching the plateau. Specifically, it may be referred to that the first actual brightness parameter is equal to (S1+VS*t), wherein t is equal to the value of the first target charging time minus the sum of the third charging time and the first charging time to obtain the first target charging time.

Figure 9:
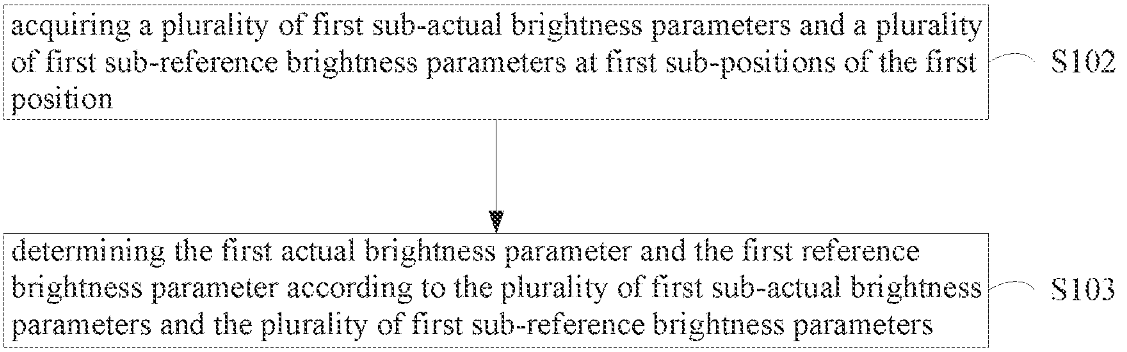
FIG. 9 is a flowchart of a sixth embodiment of a control method of a display panel an embodiment of present disclosure.

In an embodiment, as shown in FIG. 9, the step S1 may further include but is not limited to the following steps.

Step S102, acquiring a plurality of first sub-actual brightness parameters and a plurality of first sub-reference brightness parameters at first sub-positions of the first position.

The first position may include a plurality of the first sub-positions, and each of the first sub-positions is provided with a corresponding one of the sub-pixels. In this embodiment, the first sub-actual brightness parameter and the first sub-reference brightness parameter corresponding to the sub-pixel located at each of the first sub-positions in the first position may be respectively acquired.

Step S103, determining respectively the first actual brightness parameter and the first reference brightness parameter according to the plurality of first sub-actual brightness parameters and the plurality of first sub-reference brightness parameters.

The first actual brightness parameter may be an average of a plurality of the first sub-actual brightness parameters, and the first reference brightness parameter may be an average of a plurality of the first sub-reference brightness parameters. In this embodiment, the corresponding first actual brightness parameter and the first reference brightness parameter may be determined, for example, in the unit of the first position. In the step S2 to the step S4, the first position may be used as a unit, and the same processing may be performed on a plurality of the first sub positions therein. That is, the first preset brightness parameter may be an average number of a plurality of first sub-preset brightness parameters corresponding to a plurality of the sub-pixels. Further, the sub-pixels at each of the first sub-positions in the first positions have the same first compensated brightness parameter and the same first target brightness parameter.

In this embodiment, it is understandable that the first compensated brightness parameter and the first target brightness parameter may be acquired as the corresponding parameters of the plurality of sub-pixels. It is equivalent to acquiring the parameters of multiple sub-pixels at one time, which improves the processing efficiency.

Figure 10:
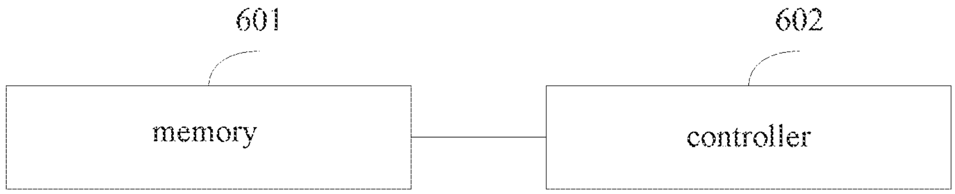
FIG. 10 is a schematic diagram of a controller and a memory in a display panel an embodiment of present disclosure.

The present disclosure also provides a display panel, as shown in FIG. 10, the display panel includes a memory 601 and a controller 602, and the controller 602 is configured to execute several instructions stored in the memory 601 to implement the control method of the display panel as described above.

The memory 601 may be used to store software programs and modules, and it can mainly include a program storage area and a data storage area. The controller 602 executes various functional applications and data processing by running the software programs and modules stored in the memory 601.

The controller 602 runs or executes at least one of software programs and a module stored in the memory 601, and calls data stored in the memory 601. Various functions and processing data may be executed for overall monitoring.

In some embodiments, the controller 602 acquires the first actual brightness parameter and the first reference brightness parameter at the first position in the display panel.

Specifically, the controller 602 acquires the first pixel voltage and the first data voltage at the first position in the display panel as the first actual brightness parameter and the first reference brightness parameter, respectively.

Specifically, the controller 602 acquires the plurality of first sub-actual brightness parameters and the plurality of first sub-reference brightness parameters of the plurality of first sub-positions in the first position and determines the first actual brightness parameter and the first reference brightness parameter respectively according to the plurality of the first sub-actual brightness parameters and the plurality of the first sub-reference brightness parameters.

In some embodiments, the controller 602 determines whether the absolute value of the difference between the first reference brightness parameter and the first actual brightness parameter is less than a first threshold.

In some embodiments, the controller 602 determines the first compensation brightness parameter at the first position in the display panel according to the difference between the first reference brightness parameter and the first actual brightness parameter.

Specifically, the controller 602 acquires the position difference parameter between the third position and the first position in the display panel and determines the third compensation brightness parameter at the third position in the display panel according to the position difference parameter and the first compensation brightness parameter.

In some embodiments, the controller 602 determines the first target brightness parameter of the first position in the display panel according to the first compensated brightness parameter and the first preset brightness parameter at the first position in the display panel.

Specifically, the controller 602 acquires the first preset data voltage of the first position in the display panel and determines the first target data voltage at the first position in the display panel according to the first compensated brightness parameter and the first preset data voltage.

Specifically, the controller 602 acquires the first common voltage of the first position in the display panel and determines the first target common voltage at the first position in the display panel according to the first compensated brightness parameter and the first common voltage.

Specifically, the controller 602 acquires the difference between the first target common voltage and the second common voltage at the second position in the display panel as the first difference value, updates the second common voltage to the first target common voltage, acquires the difference between the second pixel voltage and the second data voltage at the second position in the display panel as the second difference value, and determines the second target data voltage at the second position in the display panel according to the first difference value, the second difference value, and the second preset data voltage at the second position in the display panel.

Specifically, the controller 602 acquires the first charging duration of the first position in the display panel and determines the first target charging duration of the first position in the display panel according to the first compensated brightness parameter and the first charging duration.

In an embodiment, the present disclosure provides a storage medium, and the storage medium stores several instructions, and the instructions are used for execution by the controller to implement the overvoltage compensation method as described above. It should be noted that those of ordinary skill in the art can understand that all or part of the steps in the various methods of the foregoing embodiments can be completed by instructing relevant hardware through programs. The program may be stored in a computer-readable storage medium, such as stored in a memory of an electronic device and executed by at least one processor in the electronic device. The execution process may include a process such as an embodiment of the charging reminder method. Storage media may include read only memory (ROM), random access memory (RAM), magnetic disks or optical disks, etc.

The present disclosure provides a display panel, a control method thereof, and a storage medium, wherein the method includes steps of acquiring a first actual brightness parameter and a first reference brightness parameter at a first position in a display panel; determining whether an absolute value of a difference value between the first reference brightness parameter and the first actual brightness parameter is less than a first threshold; if not, determining a first compensated brightness parameter at the first position in the display panel according to the difference value between the first reference brightness parameter and the first actual brightness parameter; determining a first target brightness parameter at the first position in the display panel according to the first compensated brightness parameter and a first preset brightness parameter at the first position in the display panel. In this solution, the first target brightness parameter is determined according to the first compensated brightness parameter and the first preset brightness parameter at the first position in the display panel, to load electrical signals corresponding to the first target brightness parameter to the first position. Since the difference between the first reference brightness parameter and the first actual brightness parameter is considered to determine the first target brightness parameter, the first position emits the brightness corresponding to the first preset brightness parameter, which may effectively reduce the abnormal brightness caused by the parasitic capacitance, thereby improving the flickering phenomenon of the bipolar display during the transition between the forward bias and the reverse bias and improving the display quality of the display panel.

The display panel, the control method thereof, and the storage medium provided by the embodiments of the present disclosure are described in detail above. Specific examples are used in this article to illustrate the principles and implementation of the present disclosure. The descriptions of the above examples are only used to help understand the technical solutions and core ideas of the present disclosure. Those of ordinary skill in the art should understand that: they may still modify the technical solutions described in the foregoing embodiments, or equivalently replace some of the technical features. These modifications or replacements do not cause the essence of the corresponding technical solutions to deviate from the scope of the technical solutions of the embodiments of the present disclosure.

What is claimed is:

1. A control method of display panel, comprising steps of:
- acquiring a first actual brightness parameter and a first reference brightness parameter at a first position in a display panel;
- determining whether an absolute value of a difference value between the first reference brightness parameter and the first actual brightness parameter is less than a first threshold;
- determining a first compensated brightness parameter at the first position in the display panel according to the difference value between the first reference brightness parameter and the first actual brightness parameter when the absolute value of the difference value between the first reference brightness parameter and the first actual brightness parameter is greater than the first threshold;
- determining a first target brightness parameter at the first position in the display panel according to the first compensated brightness parameter and a first preset brightness parameter at the first position in the display panel,
- wherein after the step of determining the first compensated brightness parameter at the first position in the display panel according to the difference value between the first reference brightness parameter and the first actual brightness parameter, the control method further comprises steps of:
- acquiring a position difference parameter between a second position and the first position in the display panel; and
- determining a second compensated brightness parameter at the second position in the display panel according to the position difference parameter and the first compensated brightness parameter.

2. The control method of display panel according to claim 1, wherein the step of acquiring the first actual brightness parameter and the first reference brightness parameter at the first position in the display panel comprises:
- acquiring a first pixel voltage and a first data voltage at the first position in the display panel as the first actual brightness parameter and the first reference brightness parameter, respectively.

3. The control method of display panel according to claim 2, wherein the step of determining the first target brightness parameter at the first position in the display panel according to the first compensated brightness parameter and the first preset brightness parameter at the first position in the display panel comprises:
- acquiring a first preset data voltage at the first position in the display panel; and
- determining a first target data voltage of the first position in the display panel according to the first compensated brightness parameter and the first preset data voltage.

4. The control method of display panel according to claim 2, wherein the step the step of determining the first target brightness parameter at the first position in the display panel according to the first compensated brightness parameter and the first preset brightness parameter at the first position in the display panel comprises:
- acquiring a first common voltage at the first position in the display panel; and
- determining a first target common voltage at the first position in the display panel according to the first compensated brightness parameter and the first common voltage.

5. The control method of display panel according to claim 4, wherein after the step of determining the first target common voltage at the first position in the display panel according to the first compensated brightness parameter and the first common voltage, the control method further comprises steps of:
- acquiring a difference value between the first target common voltage and a third common voltage at a third position in the display panel as a first difference value;
- updating the third common voltage to be the first target common voltage;
- acquiring a difference value between a third pixel voltage and a third data voltage at the third position in the display panel as a third difference value; and
- determining a third target data voltage at the third position in the display panel according to the first difference value, the third difference value, and a third preset data voltage at the third position in the display panel.

6. The control method of display panel according to claim 4, wherein after the step of determining the first target common voltage at the first position in the display panel according to the first compensated brightness parameter and the first common voltage, the control method further comprises:
- updating the first common voltage to be the first target common voltage.

7. The control method of display panel according to claim 1, wherein the step of determining the first target brightness parameter at the first position in the display panel according to the first compensated brightness parameter and the first preset brightness parameter at the first position in the display panel comprises steps of:
- acquiring a first charging duration at the first position in the display panel; and
- determining a first target charging duration at the first position in the display panel according to the first compensated brightness parameter and the first charging duration.

8. The control method of display panel according to claim 1, wherein the step of acquiring the first actual brightness parameter and the first reference brightness parameter at the first position in the display panel comprises steps of:
- acquiring a plurality of first sub-actual brightness parameters and a plurality of first sub-reference brightness parameters at first sub-positions of the first position; and
- determining respectively the first actual brightness parameter and the first reference brightness parameter according to the plurality of first sub-actual brightness parameters and the plurality of first sub-reference brightness parameters.

9. The control method of display panel according to claim 1, wherein the first actual brightness is an actual brightness value of a sub-pixel located in the first position or a parameter related to the actual brightness value of the sub-pixel located in the first position.

10. The control method of display panel according to claim 1, wherein the first preset brightness parameter is a theoretical brightness value of a sub-pixel located in the first position or a parameter related to the theoretical brightness value of the sub-pixel located in the first position during a screen display period of the display panel.

11. The control method of display panel according to claim 1, wherein the first target brightness parameter is an actual brightness value corresponding to the first target brightness parameter of a sub-pixel located in the first position, and the first target brightness parameter is equal to a theoretical brightness value corresponding to the first preset brightness parameter of the sub-pixel located in the first position.

12. A display panel, comprising a controller and a memory, wherein the controller is used to execute instructions stored in the memory to implement a method comprising steps of:

acquiring a first actual brightness parameter and a first reference brightness parameter at a first position in a display panel;

determining whether an absolute value of a difference value between the first reference brightness parameter and the first actual brightness parameter is less than a first threshold;

determining a first compensated brightness parameter at the first position in the display panel according to the difference value between the first reference brightness parameter and the first actual brightness parameter when the absolute value of the difference value between the first reference brightness parameter and the first actual brightness parameter is greater than the first threshold;

determining a first target brightness parameter at the first position in the display panel according to the first compensated brightness parameter and a first preset brightness parameter at the first position in the display panel, wherein after the step of determining the first compensated brightness parameter at the first position in the display panel according to the difference value between the first reference brightness parameter and the first actual brightness parameter, the control method further comprises steps of:

acquiring a position difference parameter between a second position and the first position in the display panel; and determining a second compensated brightness parameter at the second position in the display panel according to the position difference parameter and the first compensated brightness parameter.

13. A storage medium, storing instructions, wherein the instructions are used for execution by a controller to implement a method comprising steps of:

acquiring a first actual brightness parameter and a first reference brightness parameter at a first position in a display panel;

determining whether an absolute value of a difference value between the first reference brightness parameter and the first actual brightness parameter is less than a first threshold;

determining a first compensated brightness parameter at the first position in the display panel according to the difference value between the first reference brightness parameter and the first actual brightness parameter when the absolute value of the difference value between the first reference brightness parameter and the first actual brightness parameter is greater than the first threshold;

determining a first target brightness parameter at the first position in the display panel according to the first compensated brightness parameter and a first preset brightness parameter at the first position in the display panel, wherein after the step of determining the first compensated brightness parameter at the first position in the display panel according to the difference value between the first reference brightness parameter and the first actual brightness parameter, the control method further comprises steps of:

acquiring a position difference parameter between a second position and the first position in the display panel; and determining a second compensated brightness parameter at the second position in the display panel according to the position difference parameter and the first compensated brightness parameter.

* * * * *